United States Patent
Birke et al.

(10) Patent No.: US 9,654,410 B2
(45) Date of Patent: *May 16, 2017

(54) VIRTUAL QUANTIZED CONGESTION NOTIFICATION

(71) Applicant: INTERNATIONAL BUSINESS MACHINES CORPORATION, Armonk, NY (US)

(72) Inventors: Robert Birke, Kilchberg (CH); Daniel Crisan, Zug (CH); Casimer M. Decusatis, Poughkeepsie, NY (US); Mircea Gusat, Langnau (CH); Keshav G. Kamble, Fremont, CA (US); Cyriel J. Minkenberg, Gutenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,668

(22) Filed: Jun. 26, 2015

(65) Prior Publication Data

US 2015/0295839 A1    Oct. 15, 2015

Related U.S. Application Data

(63) Continuation of application No. 13/857,364, filed on Apr. 5, 2013, now Pat. No. 9,166,925.

(51) Int. Cl.
| | | |
|---|---|---|
| H04L 12/873 | (2013.01) | |
| H04L 12/26 | (2006.01) | |
| H04L 12/835 | (2013.01) | |
| H04L 12/931 | (2013.01) | |
| H04L 12/801 | (2013.01) | |

(Continued)

(52) U.S. Cl.
CPC .......... H04L 47/52 (2013.01); H04L 43/0876 (2013.01); H04L 47/30 (2013.01); H04L 49/70 (2013.01); *H04L 12/5602* (2013.01); *H04L 47/33* (2013.01); *H04L 2012/5632* (2013.01)

(58) Field of Classification Search
CPC . H04L 2012/5632; H04L 47/52; H04L 49/70; H04L 12/5602; H04L 2012/5635; H04L 2012/5636; H04L 2012/5631

See application file for complete search history.

(56) References Cited

U.S. PATENT DOCUMENTS

| | | | |
|---|---|---|---|
| 5,768,258 A * | 6/1998 | Van As | H04L 12/5602 370/235 |
| 7,054,269 B1 * | 5/2006 | Luguern | H04L 12/5602 370/232 |
| 8,174,984 B2 | 5/2012 | Tripathi et al. | |

(Continued)

Primary Examiner — Raj Jain
(74) Attorney, Agent, or Firm — Shimokaji IP

(57) ABSTRACT

Congestion management for data traffic in a virtual domain identifies a congestion source and sends a message to the source to adjust data traffic rates. The source may be a virtual machine hosted by a physical server with one or more virtual servers incorporated. A congestion manager may identify the source and send the message to the source without affecting other data sources hosted by the physical server or the virtual servers. In some embodiments, information about the congestion source may be encapsulated in a packet payload readable only by the congestion source so only the congestion source receives the instruction to adjust the transmission rate.

20 Claims, 11 Drawing Sheets

(51) Int. Cl.
  *H04L 12/70* (2013.01)
  *H04L 12/54* (2013.01)

(56) References Cited

U.S. PATENT DOCUMENTS

| | | | |
|---|---|---|---|
| 9,025,443 B2* | 5/2015 | Hayakawa | H04L 69/14 370/229 |
| 2006/0018329 A1* | 1/2006 | Nielsen | H04L 47/52 370/401 |
| 2009/0300209 A1 | 12/2009 | Elzur | |
| 2012/0063316 A1* | 3/2012 | Ghanwani | H04L 47/10 370/235 |
| 2013/0205038 A1* | 8/2013 | Decusatis | H04L 47/11 709/235 |

* cited by examiner

VIRTUAL QUANTIZED CONGESTION NOTIFICATION

CROSS REFERENCE TO RELATED APPLICATION

This application claims the benefit of priority, under 35 U.S.C. §119 of U.S. patent application Ser. No. 13/857,364, filed Apr. 5, 2013, entitled VIRTUAL QUANTIZED CONGESTION NOTIFICATION, the entire disclosure of which is incorporated in its entirety by reference herein.

BACKGROUND

The present invention relates to network management, and more specifically, to virtual quantized congestion notification in a network with virtual switching devices.

In conventional physical networks, network equipment working at the lower levels was allowed to handle congestive events by simply dropping excess traffic. Providing reliability was instead left to the upper layers. Handling congestion by dropping frames comes at the expense of wasting network resources to transmit the frames. Hence, a lot of effort has been put into making the hardware network infrastructure lossless through the use of flow controls. In some physical networks, a lossless environment may be achieved using technologies such as Infiniband and Converged Enhanced Ethernet (CEE).

Employing lossless techniques to the virtual networking domain has provided a different set of challenges, especially to the virtual counterparts of the network equipment used inside the hypervisors to provide connectivity to the virtual machines. Flow control for a physical switching device controls the device as a single entity. Flow control for a physical switching device does not account for virtual devices hosted by the physical device. For example, a physical network interface card (NIC) may host multiple virtual machines through a common virtual switch and hypervisor. When the buffer queue of a virtual machine backs up, flow control may send a message to block incoming traffic to the backed up queue. However, since all buffer queues are running through the same hypervisor on the same physical NIC, the NIC is unable to distinguish one virtual machine's queue from the others. The result is that every queue receives the block command even though the other queues may have been running without issue. Thus, the efficiency of virtual switches may drop dramatically whenever congestion occurs in a buffer queue.

SUMMARY

According to one embodiment of the present invention, a computer program product for controlling congestion of data traffic in a virtual switching device, the computer program product comprises a computer readable storage medium having program code embodied therewith. The program code may be readable/executable by a processor. The program code may be configured to determine, by the processor, that a receiving queue in the virtual switching device is receiving data packets at a faster rate than transmission of data packets from the virtual switching device or faster than a programmed rate of reception for the receiving queue, indicating congestion in the receiving queue. The program code may be configured to determine, by the processor, a source of the congestion for the data packets being received by the receiving queue. The program code may be configured to control, by the processor, a decrease in a transmission rate of the data packets from the source of congestion to the receiving queue in the virtual switching device.

According to another embodiment of the present invention, a method of controlling congestion of data traffic in a virtual switching device comprises reading an amount of data packets in a receiving queue of a virtual switching device; determining if the amount of data packets in the receiving queue exceeds a threshold number of data packets for the receiving queue; reading a virtual machine source address of the data packets in the receiving queue; and sending a notification message to the virtual machine source address instructing the virtual machine source address to decrease a rate of transmission of the data packets.

According to yet another embodiment of the present invention, a network switch comprises a physical network interface card (NIC). A virtual switching device may be interfaced with the physical NIC and connected to a source of data traffic. A buffer module may be connected to the virtual switching device including a receiving queue for data packets received by the virtual switching device from the source of data traffic. The virtual switching device may be configured to forward a notification message to the source of data traffic indicating congestion in the receiving queue.

DETAILED DESCRIPTION

Figure 1:
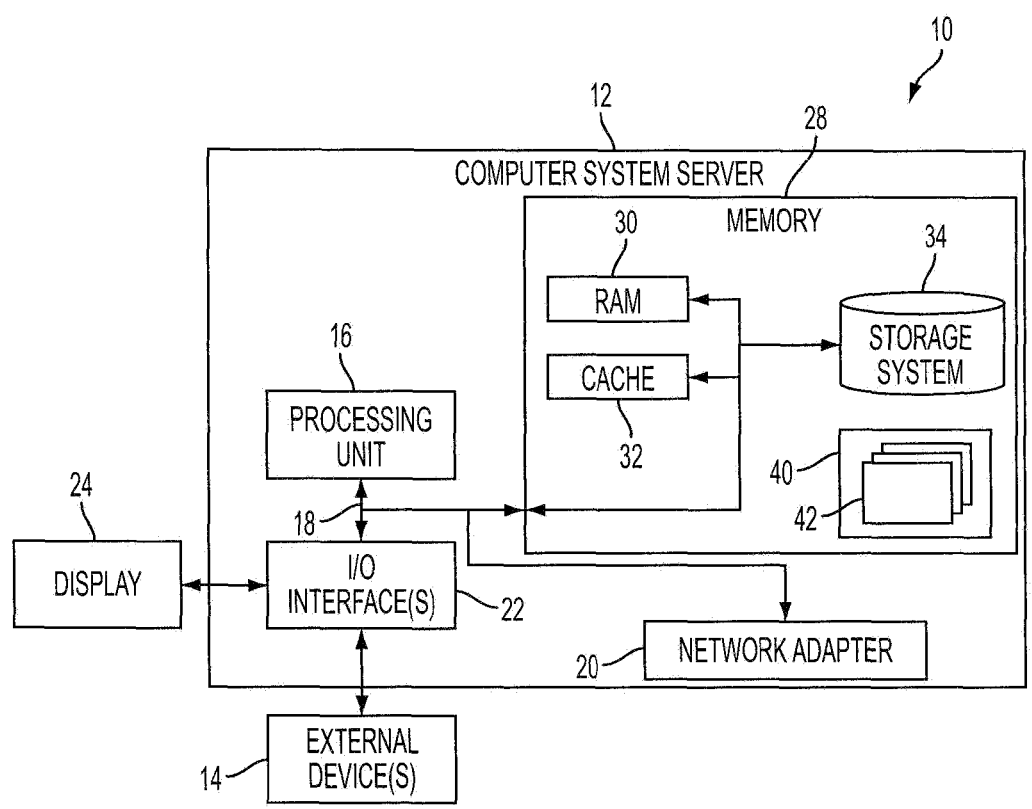
FIG. 1 depicts a cloud computing node according to an embodiment of the present invention.

Broadly, embodiments of the subject technology provide management of congested data traffic in virtual switches. In some embodiments, a lossless switching environment may be provided in a virtual domain of a network by identifying congestion points and throttling down the source(s) of transmitted data. Control of the source(s) contributing to congestion may be performed on an individual source basis rather than by throttling down all virtual sources associated with a physical switch device. For example, embodiments of the subject technology may compare the traffic injection rate of data sources to the traffic consumption rates at the destinations or bottleneck links along a data traffic path. The mismatch between the injection and consumption rate may be computed by observing the state of the queues of the virtual switching devices over time. The state information may then be sent back towards the source and may be used to adjust the injection rate of the source.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus may provide processes for implementing the functions/acts specified in the flowchart and/or block diagram block or blocks.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth herein.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processing units or processors 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (110) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of the computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
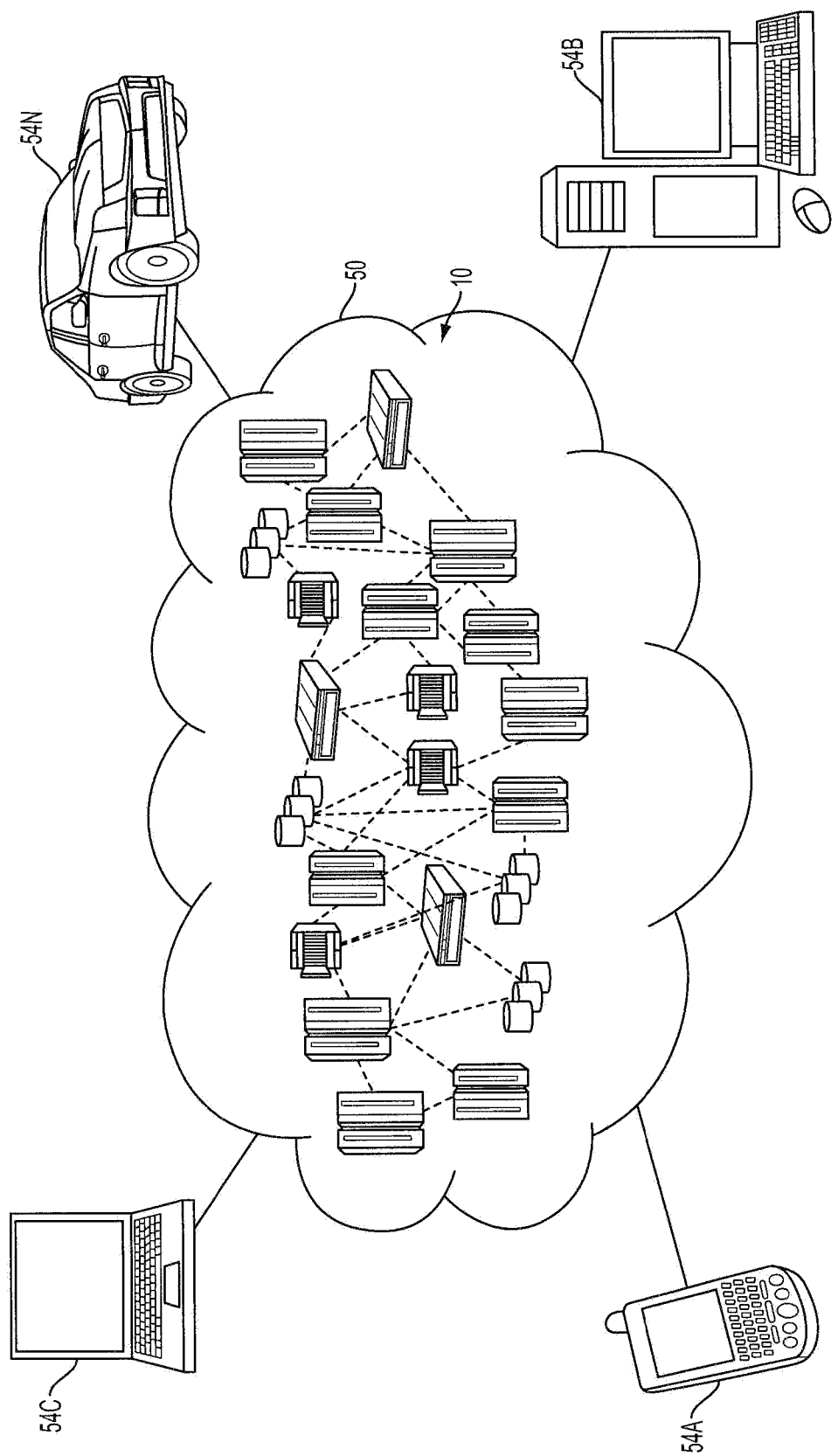
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone MA, desktop computer MB, laptop computer MC, and/or an automobile computer system MN, may communicate. The nodes 10 may communicate with one another. They may be grouped physically or virtually, in one or more networks, such as Private, Community, Public, or Hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
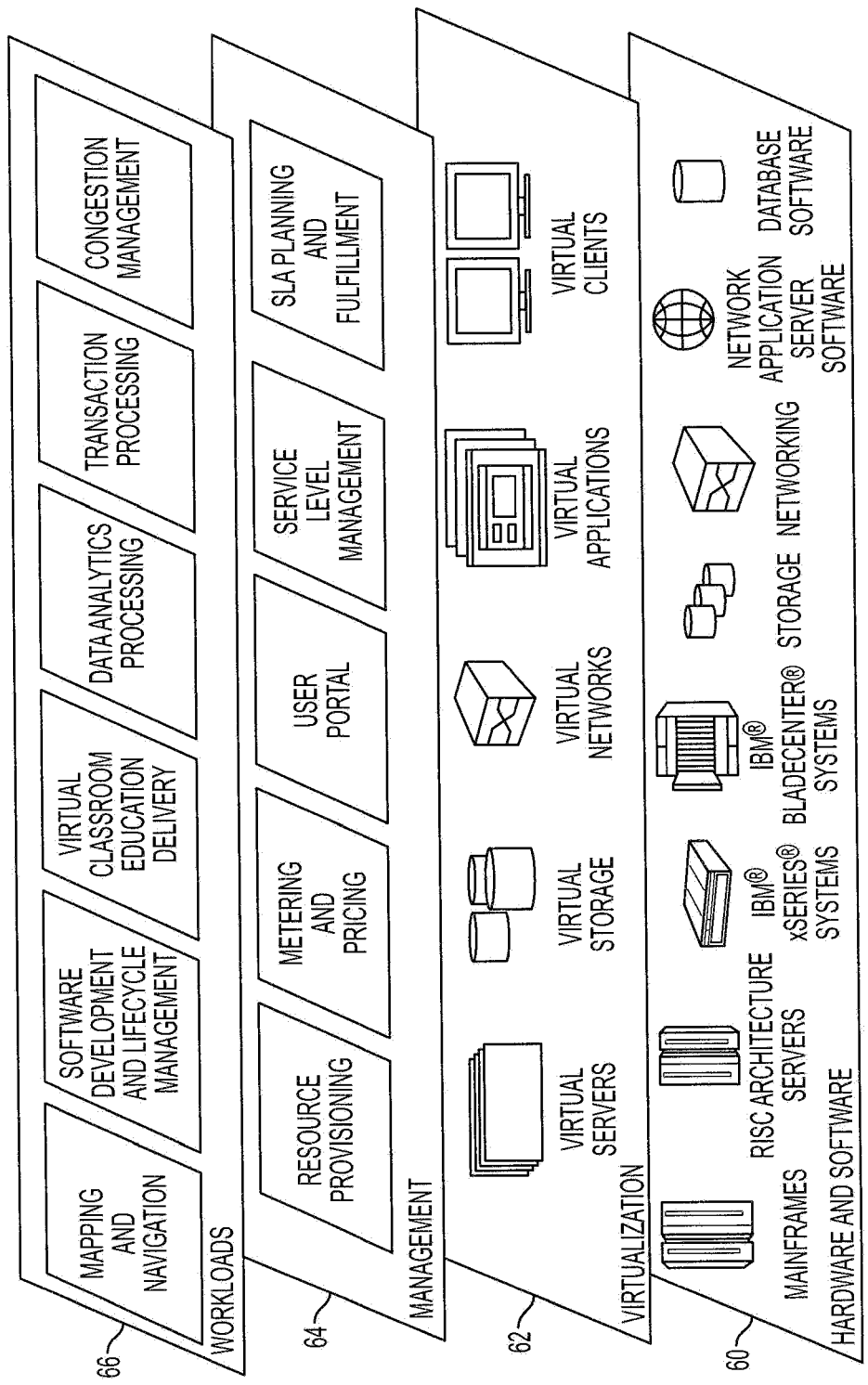
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual machines, virtual servers; virtual storage; virtual networks, including virtual private networks; virtual applications; and operating systems; and virtual clients.

In one example, a management layer 64 may provide the functions described below. Resource provisioning may provide dynamic procurement of computing resources and other resources that are utilized to perform tasks within the cloud computing environment. Metering and Pricing may provide cost tracking, as resources are utilized within the cloud computing environment, and may provide billing or invoicing for consumption of these resources. In one example, these resources may comprise application software licenses. Security may provide identity verification for cloud consumers and tasks, as well as protection for data and other resources. A user portal may provide access to the cloud computing environment for consumers and system administrators. Service level management may provide cloud computing resource allocation and management such that required service levels are met. Service Level Agreement (SLA) planning and fulfillment may provide pre-arrangement for, and procurement of, cloud computing resources for which a future requirement is anticipated in accordance with an SLA.

A workloads layer 66 may provide functionality for which the cloud computing environment may be utilized. Examples of workloads and functions that may be provided from this layer include: mapping and navigation; software development and lifecycle management; virtual classroom education delivery; data analytics processing; transaction processing; and data traffic congestion management.

Figure 4:
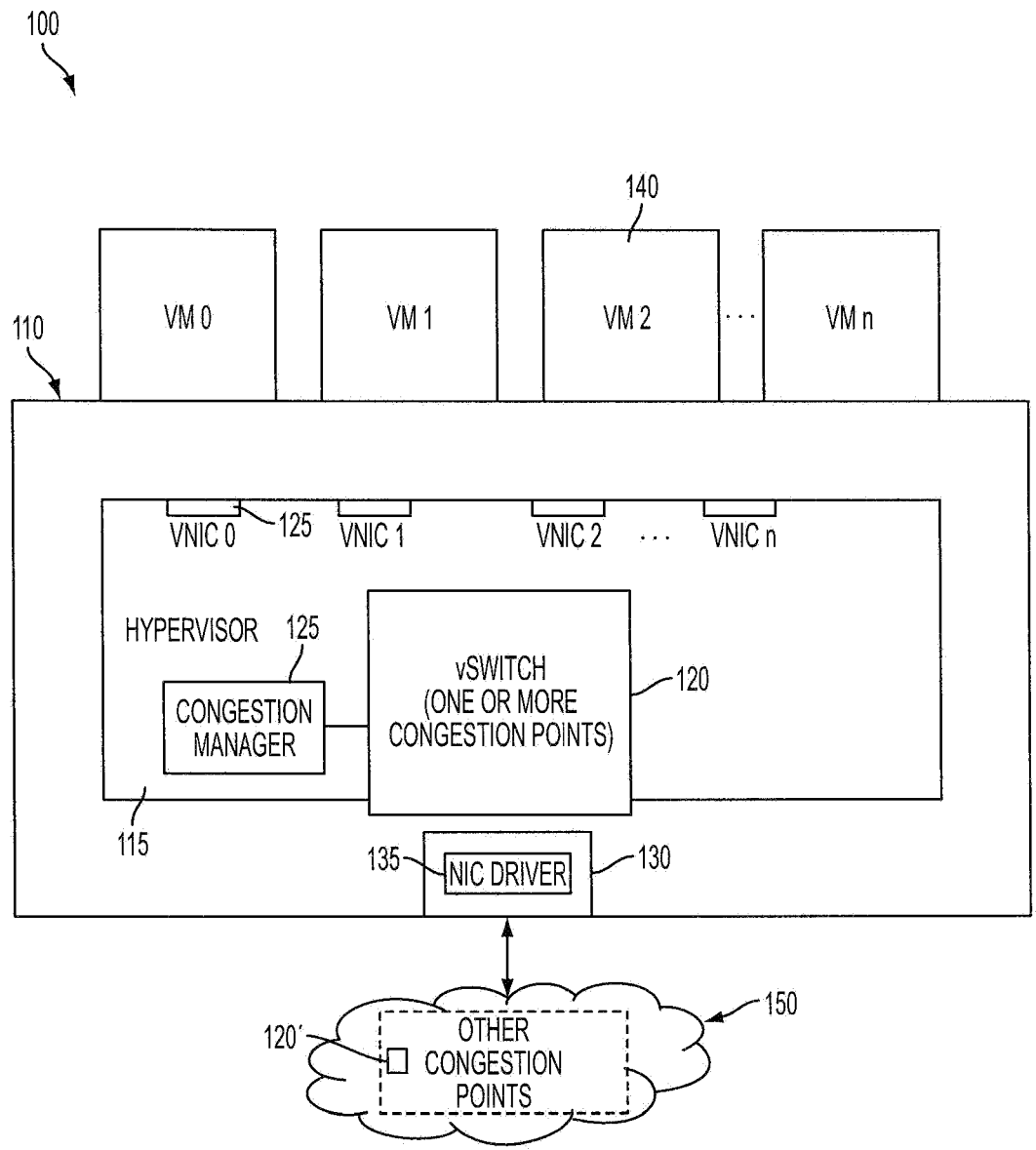
FIG. 4 is a block diagram of a switching system for a virtual domain according to yet another embodiment of the present invention.

Referring now to FIG. 4, a switching system 100 is shown according to an exemplary embodiment of the present invention. The switching system 100 may include a virtualized server 110 connected to a network 150. The virtualized server 110 may include a virtual switch 120 with one or more congestion points of data traffic. The virtual switch 120 may be connected to the network 150 via a network interface card (NIC) 130 controlled by a NIC driver 135. A hypervisor 115 may be configured to control one or more virtual machines 140 (labeled "VM 0" through "VM n") connected to the virtual switch 120 through virtual NICs 125 (labeled "vNIC 0" through "vNIC n"). The hypervisor 115 may include a congestion manager module 125 with computer readable/executable instructions configured to control the injection rate of data packets into the virtual switch 120. In some embodiments, the processor 16 (FIG. 1) may execute the instructions provided by the congestion manager 125. The network 150 may include physical switches (not shown) and other virtual switches 120'. The physical switches and other virtual switches 120' in the network 150 may include other congestion points and sources of congestion. While only one virtual switch 120' is shown in the network 150, it will be understood that multiple virtual switches 120' may be present.

Figure 5:
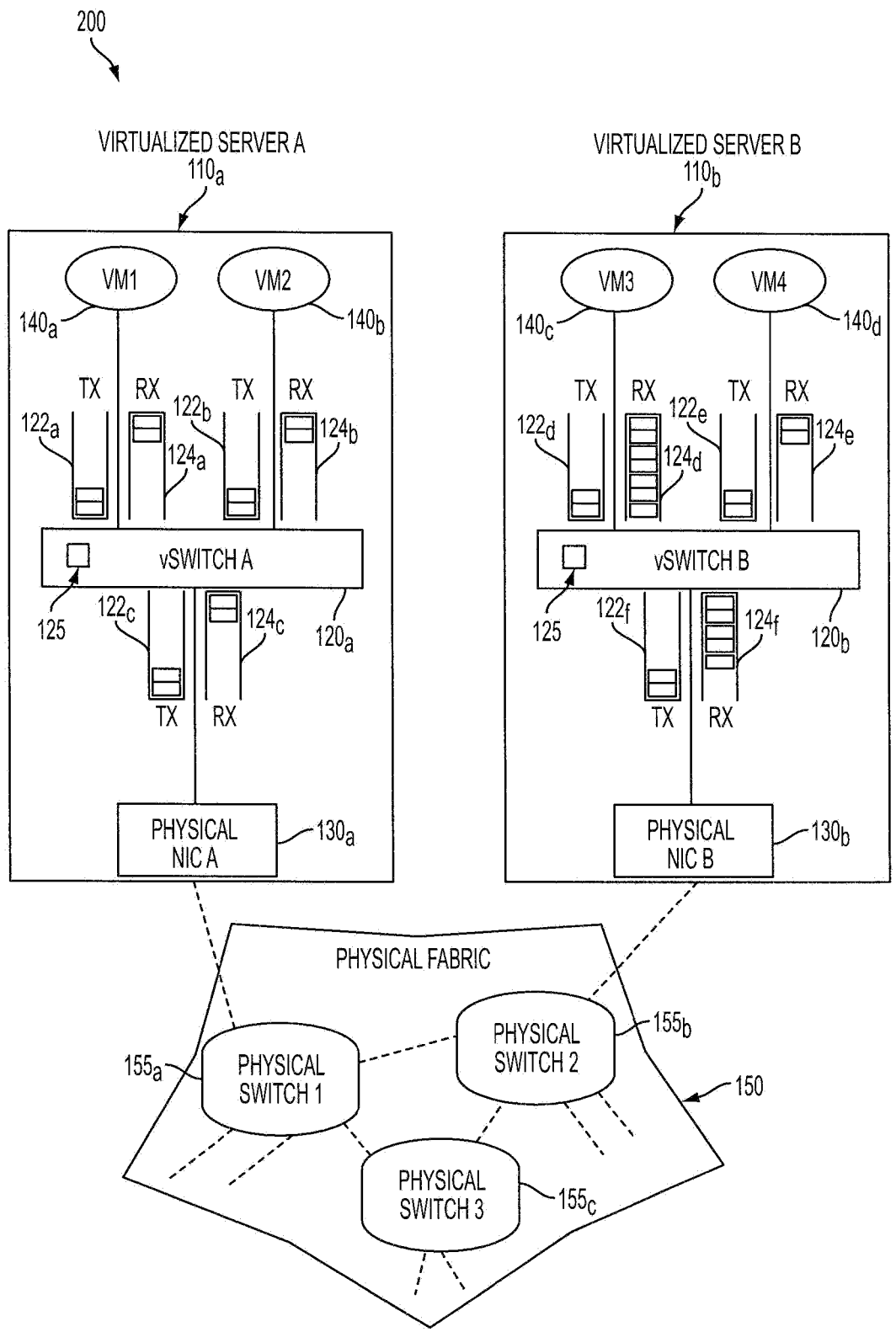
FIG. 5 is a block diagram of a switching system with virtualized servers connected to a physical network according to yet another embodiment of the present invention.

Referring now to FIG. 5, a switching system 200 is shown according to an exemplary embodiment of the present invention. In some embodiments, congestion management may be provided between sources and congested switches that are on separate physical switches. The system 200 is similar to the system 100 except that two virtualized servers 110 (shown as 110a and 110b respectively) are connected to one another separated by the network 150. In the following description of FIG. 5, when using a number without a subscript, the number may refer to any or all of the elements of that number. The virtualized server 110a may include a virtual switch 120a, a physical NIC 130a, and virtual machines 140a and 140b. The virtual machine 140a may include a transmitting buffer queue 122a and a receiving buffer queue 124a. Virtual machine 140b may include a transmitting buffer queue 122b and a receiving buffer queue 124b. Virtual switch 120a may include a transmitting buffer queue 122c and a receiving buffer queue 124c. The virtualized server 110b may include a virtual switch 120b, a physical NIC 130b, and virtual machines 140c and 140d. The virtual machine 140c may include a transmitting buffer queue 122d and a receiving buffer queue 124d. The virtual machine 140d may include a transmitting buffer queue 122e and a receiving buffer queue 124e. The virtual switch 120b may include a transmitting buffer queue 122f and a receiving buffer queue 124f. The transmitting buffer queues 122 may also be referred to as egress queues. The receiving buffer queues 124 may also be referred to as ingress queues. Virtualized server 110a may be connected to the network 150 through physical switch 155a ("Physical Switch 1"). Virtual switch 110b may be connected to the network 150 through physical switch 155b ("Physical Switch 2"). Physical switches 155a and 155b may be connected to a physical switch 155c so that data flows passing through physical switch 155a may go directly to physical switch 155b (or vice versa) or may go indirectly from physical switch 155a to physical switch 155b through physical switch 155c. The buffer receiving queues 124 may be receiving data packets from any of the transmitting buffer queues 122 outside of their own associated switching device (virtual switch 120 or virtual machine 140).

The congestion manager 125 may be configured to determine which source (transmitting buffer queue 122) is causing congestion in a receiving buffer queue 124. The congestion manager may identify when a receiving buffer queue 124 is congested with data packets. For example, receiving buffer queue 124d of virtual machine 140c may represent a congested queue. The congestion manager 125 may determine that receiving buffer queue 124d may be receiving data packets at a faster rate than a transmission of data packets from the virtual machine 140c. In some embodiments, the source of congestion may reside on the same virtualized server 110. For example, the virtual machine 140d residing on virtualized server 110b may be the source of congestion providing data packets to virtual machine 140c faster than expected. In some embodiments, the source of congestion may reside on a different virtualized server 110. For example, the virtual machine 140a residing on virtualized server 110a may be the source of congestion. While shown as being connected to one another via separate physical switches 155, it will be understood that some embodiments include the virtualized servers 110a and 110b being connected to the same physical switch 155 (not shown).

Figure 6:
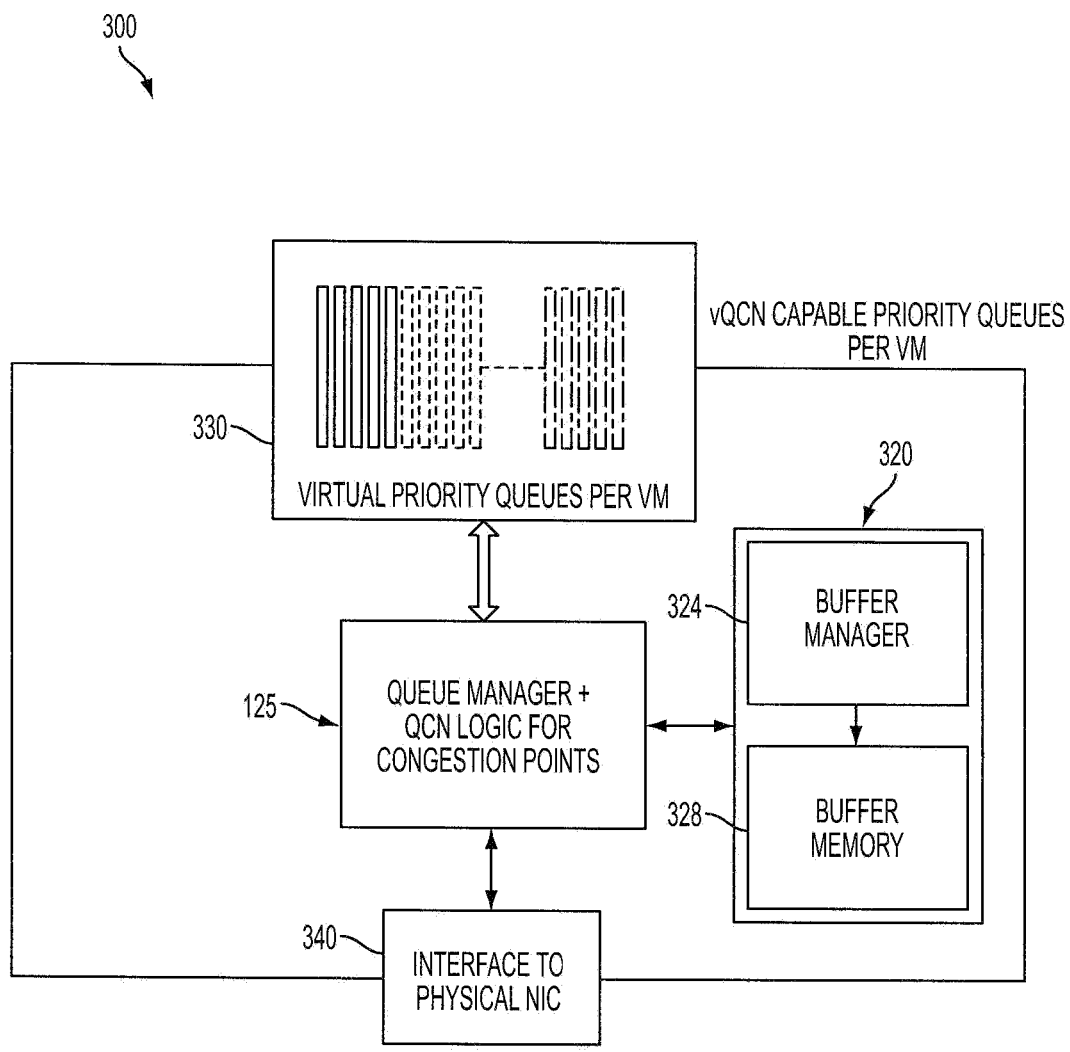
FIG. 6 is a block diagram of a traffic manager system for use in the switching system of FIG. 5.

Referring now to FIGS. 5 and 6, a traffic manager system 300 is shown according to an exemplary embodiment of the present invention. The traffic manager system 300 may reside for example, between the virtual machine 140 and the virtual switch 120. The traffic manager system 300 may include the congestion manager 125 connected to a buffer module 320, a virtual priority queue module 330, and an interface 340 to the physical NIC 130. The priority queue module 330 may be managed by the hypervisor 115 and the interface between virtual machines(s) 140 and the hypervisor 115 to send and receive packets between the two entities via, for example, a vNIC 125. Each vNIC 125 may have a dedicated number of queues (122, 124) assigned to it.

The buffer module 320 may include a buffer manager 324 and buffer memory 328. The buffer memory 328 may hold the data packets in the buffer queues 122 and 124. The buffer manager 324 may control the egress and ingress of data packets from the buffer memory 328. The buffer manager 324 may be configured to monitor the number of data packets in the buffer queues 122 and 124. For example, a threshold value for the number of data packets in queue may be stored for each buffer queue 122 and 124. The buffer manager 324 may indicate to the congestion manager 125 when the threshold value has been reached.

In an exemplary embodiment, the congestion manager 125 may be configured to sample the rate of data packets being transmitted by the transmitting buffer queue 122 to the receiving buffer queue 124. The congestion manager 125 may select a flow of data entering the receiving buffer queue 124 from one of the transmitting buffer queues 122 for sampling. The flow selection for sampling may be based on a predetermined order. The sampling may be based on various data flow attributes read by the buffer manager 324. The rate of flow entering the receiving buffer queue 124 may be, for example, in terms of kilobytes per second (kb/s). In some embodiments, the congestion manager 125 may be set to start reading a data flow after a predetermined number of are detected flows have entered the receiving buffer queue 124. The congestion manager 125 may poll the receiving buffer queue 124 to read a current number of data packets being present within a window of time. The congestion manager 125 may compare this current number of data packets to a preset value of data packets. The preset value of data packets may represent an equilibrium value for data packets that should be present the receiving buffer queue 124 during the window of time. The congestion manager 125 may compute the difference ($\Delta$) between the current number of data packets and the equilibrium value. In some embodiments the $\Delta$ may only be considered for the positive value (the current number of data packets exceeding the equilibrium) or the $\Delta$ may be taken as an absolute value. The congestion manager 125 may then compare determine whether the difference ($\Delta$) exceeds a preset threshold $\Delta$ within the transmission window of time. When the preset threshold $\Delta$ is exceeded, then the receiving buffer queue 124 may be considered congested (for example as receiving buffer queue 124').

In an exemplary embodiment, the congestion manager 125 may determine the source of the data packets being received by the congested receiving buffer queue 124d (FIG. 5). For example, the congestion manager 125 may read a virtual machine source address attached to the data packets entering the receiving buffer queue 124d. Details of encapsulating the data packets with virtual address and physical address during routing of the data packets from the source to the receiving buffer queue 124d will be described below. When the source of data packets congesting the receiving buffer queue 124d is located, the congestion manager 125 may control the transmitting buffer queue 122 to decrease a transmission rate of the data packets to the receiving buffer queue 124d. While the foregoing was described primarily in the context of a single source congesting the receiving buffer queue 124d, it will be understood that multiple sources may contribute to the congestion. Thus, in some embodiments, each of the sources unexpectedly congesting the receiving buffer queue 124' may be identified and throttled down while sources transmitting data flow within expected parameters may continue transmitting undisturbed.

Figure 7:
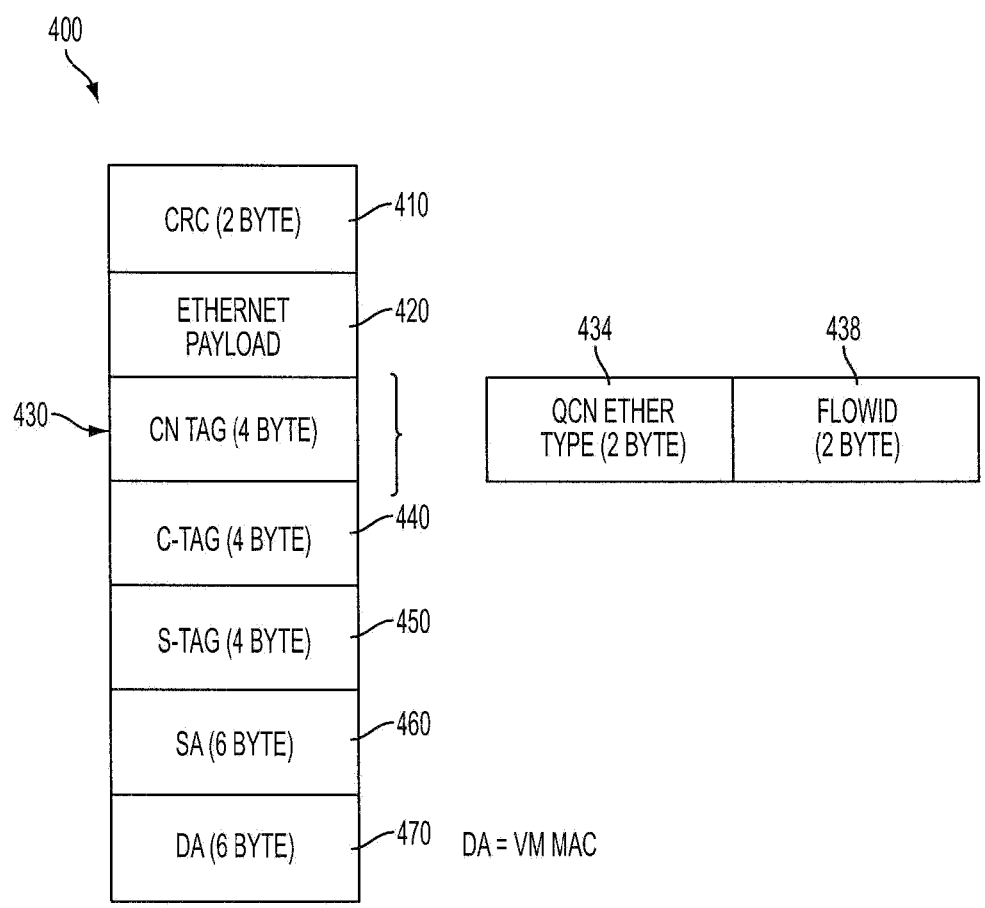
FIG. 7 is a data frame scheme for use from a physical switch to a virtual switch in the switching system of FIG. 5.
Figure 8:
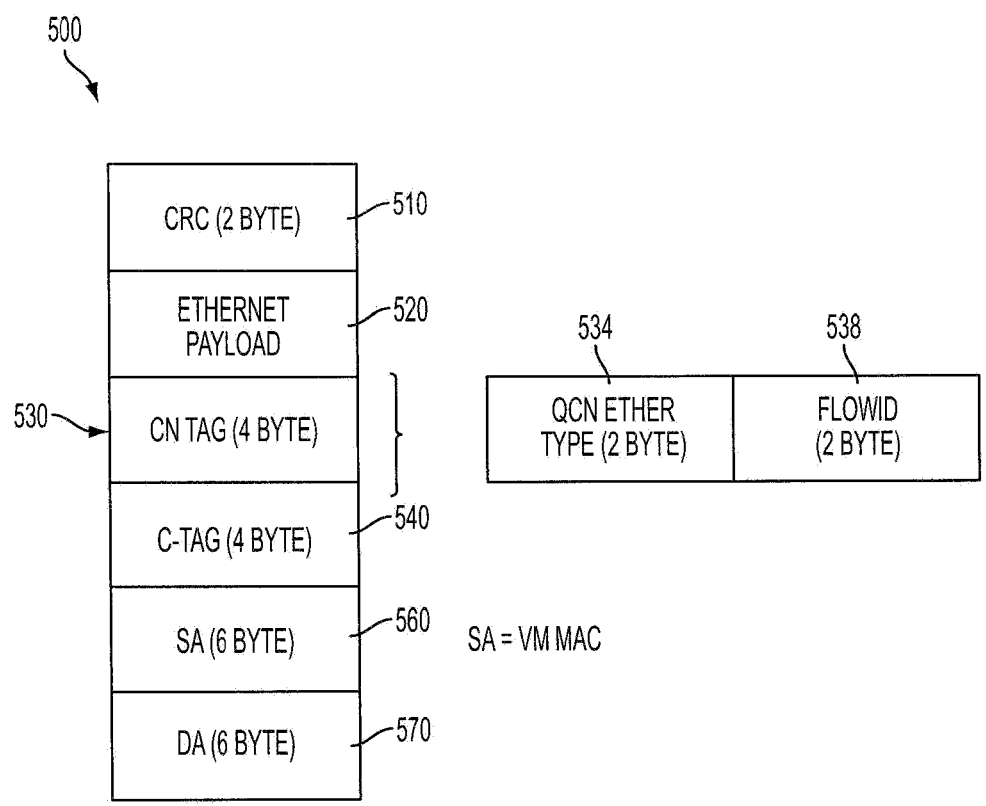
FIG. 8 is a data frame scheme for use from a virtual machine to a virtual switch in the switching system of FIG. 5.
Figure 9:
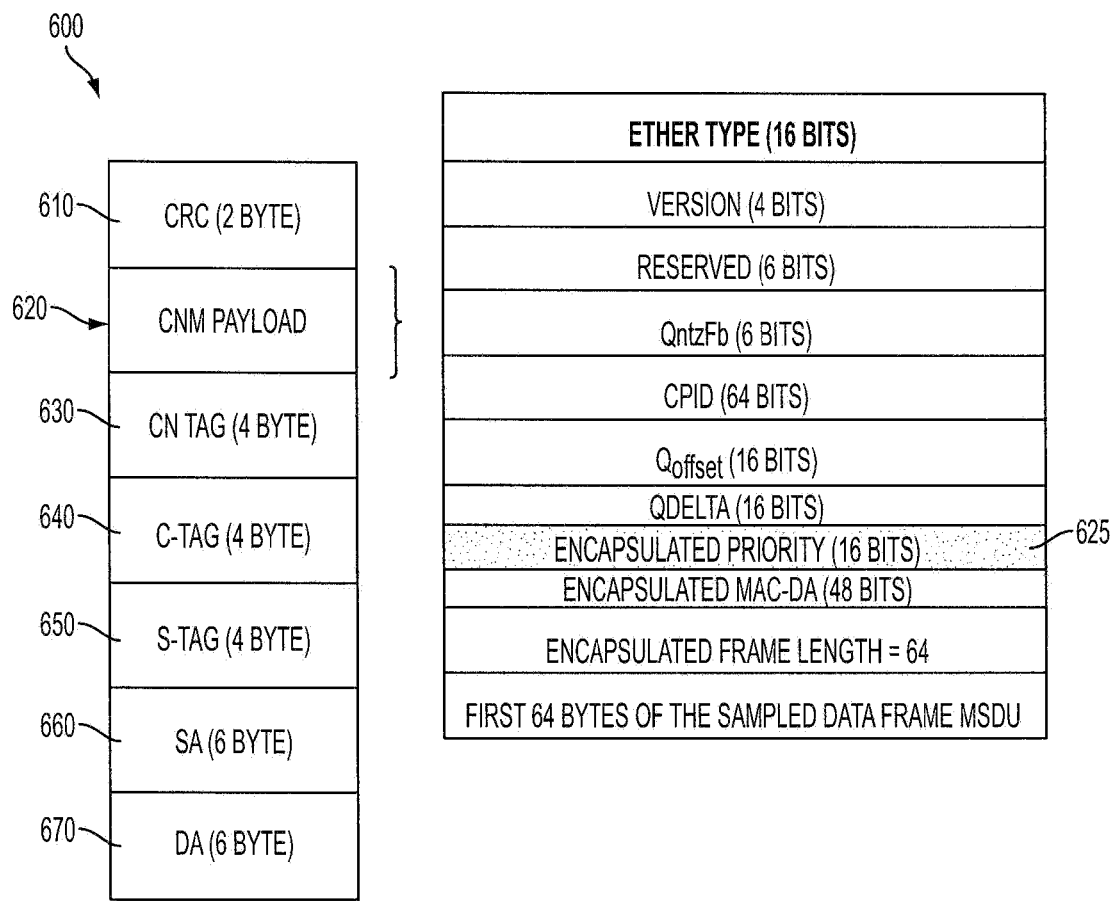
FIG. 9 is a congestion notification management frame scheme for use in sending a congestion notification message from a physical switch to a virtual switch in the switching system of FIG. 5.
Figure 10:
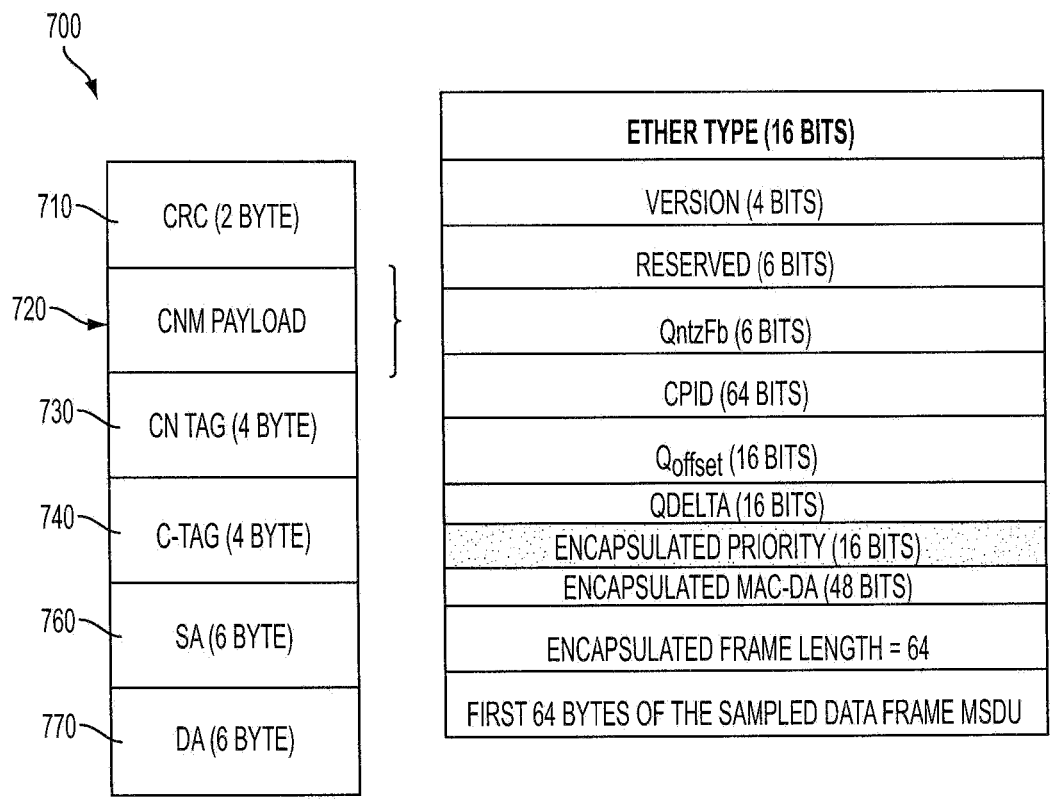
FIG. 10 is a congestion notification management frame scheme for use in sending a congestion notification message from a virtual switch to a virtual machine in the switching system of FIG. 5.

Referring now to FIGS. 4 and 5 concurrently with FIGS. 7-10, exemplary data packet schemes for routing data packets between physical and virtual devices in a network 150 are shown according to an exemplary embodiment of the present invention. In some embodiments, the congestion manager 125 may be able to distinguish between physical sources or virtual sources as the source of congestion in managing congestion by employing a virtual quantized congestion management (vQCM) technique. In general, the congestion notification manager 125 may attach a congestion notification (CN) tag to data packets. Congestion management may be enabled at any vNIC 125 interface. In addition, any data packets that egress from a virtual machine 140 or virtual switch 120 may be CN tagged. Data packets with the CN tag detected at the virtual switch 120 may invoke congestion detection, for example, by initiating sampling of data flows. Data frames may be reconfigured at different point along the network path to provide compatibility between physical to virtual interfaces. The information associated with a congestion source may be maintained allowing the congestion manager 125 to distinguish between multiple potential sources of congestion; both physical and virtual. The congestion manager may thus send a message back to the source causing congestion and control the transmission rate of data from the source without necessarily affecting other sources. In FIGS. 7-10 that follow, FIGS. 7 and 8 provide data frame schemes of data packets transmitted from the egress of a virtual switch 120 or virtual machine 140. In some embodiments, no encapsulation of information in the payload portion may be necessary. In FIGS. 9-10, exemplary congestion notification management are provided showing data frames carrying a notification message back to a congestion source. In some embodiments, an encapsulation of the payload may be used to encrypt the notification and instructions to throttle down transmission rate so that other switching devices (physical or virtual) along the network path do not inadvertently adjust their transmission rates.

Referring to FIG. 7, a data frame 400 may be configured for transmission between a physical switch 155 and a virtual switch 120. The data frame 400 may include a cyclic redundancy check (CRC) portion 410, an Ethernet payload 420, a CN tag portion 430, a C-tag portion 440, an S-tag portion 450, a source address (SA) portion 460, and a destination address (DA) portion 470. The Ethernet payload 420 may be written for comprehension in an Ethernet environment. In some embodiments, the destination address may be the MAC address for one of the virtual machines 140 in the virtual switch 120. The CN tag portion 430 may comprise a quantized congestion notification (QCN) tag 434 with Ethernet compatibility and a FLOWID portion 438 identifying a flow associated with the data frame. As may be appreciated, the CN instruction on the CN tag 430 may be compatible in physical switching points since the QCN portion 434 may be readable under Ethernet standards. Thereafter, the data frame 400 may be sent to the virtual switch 120 where it eventually enters the receiving buffer queue 124 of a virtual machine 140.

Referring now to FIG. 8, a data frame 500 may be configured for transmission between a virtual machine 140 and the virtual switch 120. The data frame 500 may include a CRC portion 510, an Ethernet payload 520, a CN tag portion 530, a C-tag portion 540, a SA portion 560, and a DA portion 570. In embodiments where the data frame 500 is being sent from the virtual machine 140 to the virtual switch 120, the source address may be the MAC address for the virtual machine 140. The CN tag 530 may include a QCN tag 534 with Ethernet compatibility and a FLOWID portion 538.

Referring to FIG. 9, an exemplary congestion notification management (CNM) frame 600 is shown. The CNM frame 600 may be configured for transmission from the physical switch 155 to the virtual switch 120 that holds the source of congestion. The CNM frame 600 may be similar to the data frame 400 except that instead of an Ethernet payload 420, the data frame 600 includes a CNM payload 620. The CNM frame 600 may include a CRC portion 610, the CNM payload 620, a CN tag portion 630, a C-tag portion 640, an S-tag portion 650, an SA portion 660, and a DA portion 670. The CNM payload may be encapsulated with code written for translation in a virtual environment. The CNM payload 620 may include the notification message with instructions to throttle down the transmission rate of data packets. The destination address 670 may be the virtual address of the virtual switch 120. The virtual switch 120 may decrypt the encapsulated CNM payload 620 for the MAC address of the congestion source. The virtual switch 120 may then modify the CNM frame 600 for transmission to its intended destination; the congestion source.

Referring now to FIG. 10, an exemplary CNM frame 700 is shown. The CNM frame 700 may be configured for transmission from the virtual switch 120 to the virtual machine 140 with the source of congestion. The CNM frame 700 may be similar to the data frame 500 except that instead of an Ethernet payload 520, the data frame 700 includes a CNM payload 720. The CNM frame 700 may include a CRC portion 710, the CNM payload 720, a CN tag portion 730, a C-tag portion 740, an SA portion 760, and a DA portion 770. In some embodiments, there may be multiple congestion sources intermediate the physical switch 120 and the intended destination of the data frame 700. For example, there may be multiple virtual machines 140 connected to the virtual switch 120 that may also be sources of congestion. The virtual switch 120 may distinguish between the various virtual machines 140 by reading the destination MAC address of the virtual machine 140 as determined by the congestion manager 125. The destination MAC address may be encapsulated in the CNM payload 720 for decrypting by virtual machines 140. If a virtual machine 140 other than the destination virtual machine 140 is on the route to the intended source, the intermediate virtual machine 140 may just forward the CNM frame 700 on to its next stop until it reaches its destination where the indication to throttle down data transmission is received and invoked. Thus, the notification message may be sent to the appropriate source of congestion without affecting connected virtual devices.

Figure 11:
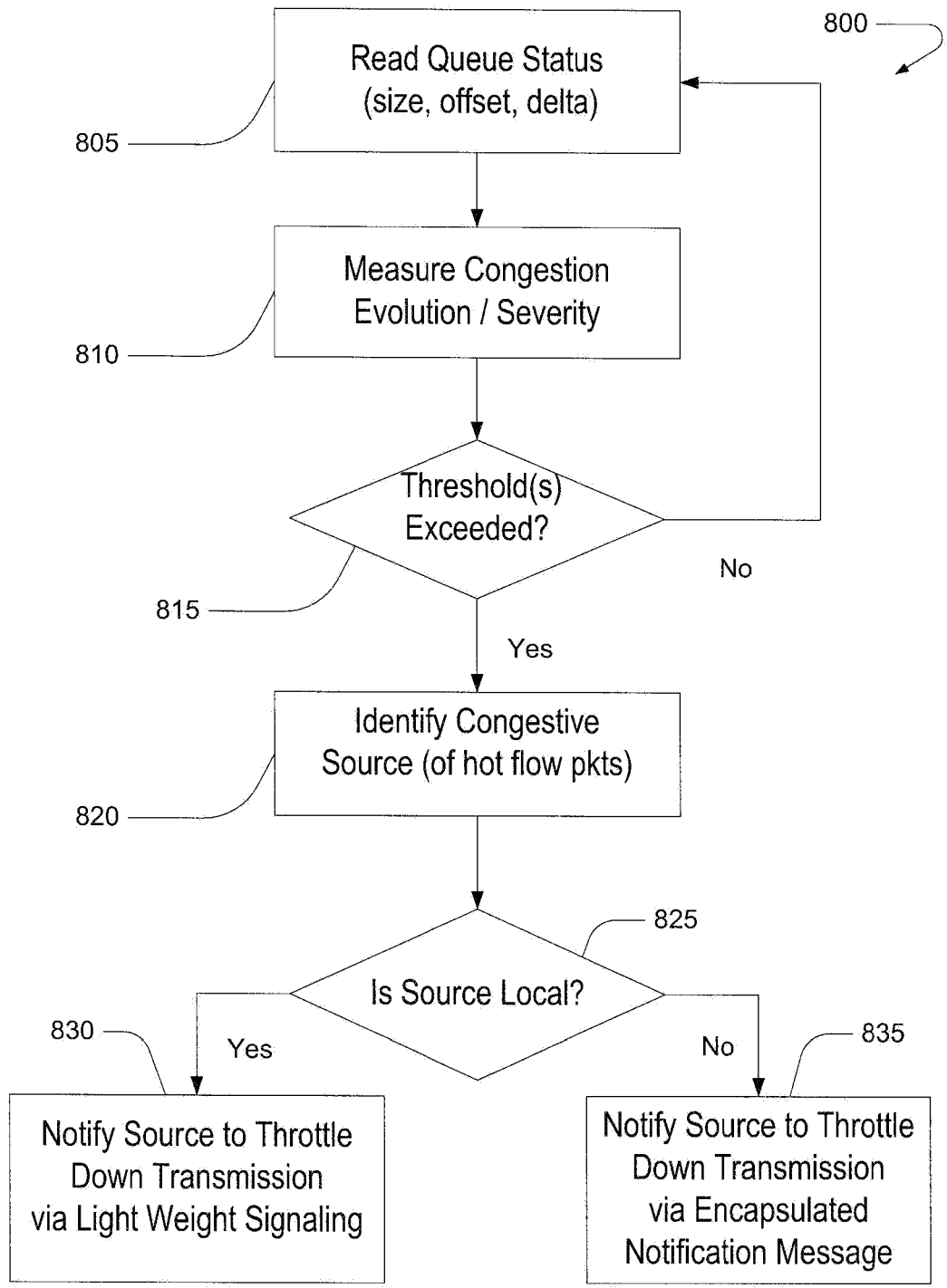
FIG. 11 is a flowchart of a method of controlling congestion of data traffic in a virtual switching device.

In FIG. 11 that follows, the actions in the blocks may be stored as instructions within the congestion manager 125, and executed by the processor 16.

Referring now to FIG. 11, a method 800 of controlling congestion of data traffic in a virtual switching device is shown according to an exemplary embodiment of the present invention. The congestion manager 125 monitors through sampling (in block 805) the queue length.

The sampling may be done according to any distribution. From the read queues length values, the congestion manager 125 may measure the built up severity of congestion (in block 810) in a queue. The congestion manager 125 may determine (in block 815) whether the receiving queue length and its growth exceed a threshold number of data packets and growth for the receiving queue. For example, the threshold may be exceeded when a difference in the sampled queue length and growth in comparison to preset equilibrium values exceeds a predetermined value. The congestion manager 125 may, after a predetermined time or other condition (for example, after a predetermined number of packets have been received), read again (in block 805) the receiving queue length until the threshold is exceeded. The congestion manager 125 may identify (in block 820) a source of congestion. The identification may be done via different methods. For example, it may be based on the values of certain packet fields e.g. source MAC address, destination MAC address and priority field, a combination of the aforementioned values or for example, a hash code or explicit tag inserted at the source. The congestion manager 125 may determine (in block 825) if the source is local (residing on the same virtualized server) or remote (residing on a different virtualized server). The congestion manager 125 may notify a remote source to decrease a rate of transmission of data packets (in block 835) via notification messages. The notification messages may both be explicit or encapsulated. The congestion manager 125 may notify a local source to decrease a rate of transmission of data packets (in block 830) via similar notification messages as for a remote source or use some other light weight communication scheme.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer readable storage medium having program code embodied therewith, the program code executable by a processor to:
   read the number of data packets in a receiving queue of a virtual switching device;
   determine if the number of data packets in the receiving queue exceeds a threshold number of data packets for the receiving queue;
   read a virtual machine source address of the data packets in the receiving queue; and
   send a notification message to the virtual machine source address instructing the virtual machine source address to decrease rate of transmission of the data packets, wherein information about a congestion virtual machine source is encapsulated in a data packet payload readable by the intended congestion virtual machine source such that the intended congestion virtual machine source receives the notification message, and wherein the notification message is based on a mismatch between a data packet injection rate and a data packet consumption rate, of the receiving queue, over time.

2. The computer readable storage medium of claim 1, wherein the data packets in the receiving queue are from a plurality of sources.

3. The computer readable storage medium of claim 2, wherein the program code is executable by a processor to:
   attach a tag including the virtual machine source address to the data packets; and
   determine the virtual machine source address by the tag of the data packets.

4. The computer readable storage medium of claim 3, wherein the program code is executable by a processor to:
   identify one of the plurality of sources by the determined virtual machine source address; and
   send the notification message to the identified one of the plurality of sources.

5. The computer readable storage medium of claim 4, wherein the identified one of the plurality of sources is a virtual machine.

6. The computer readable storage medium of claim 3, wherein the data packets of the determined virtual machine source address are data packets in the receiving queue exceeding a threshold rate of receipt.

7. The computer readable storage medium of claim 6, wherein the program code is executable by a processor to:
   sample respective rates of data packets entering the receiving queue from each of the plurality of sources;
   identify a sampling rate exceeding the threshold rate of receipt;
   identify one of the plurality of sources associated with the identified sampling rate; and
   send the notification message to the identified one of the plurality of sources.

8. A system for controlling congestion of data traffic in a virtual switching device, the system comprising:
   a processor; and
   a non-transitory computer readable storage medium having program code embodied therewith, the program code readable/executable by the processor to:
   read the number of data packets in a receiving queue of a virtual switching device;
   determine if the number of data packets in the receiving queue exceeds a threshold number of data packets for the receiving queue;
   read a virtual machine source address of the data packets in the receiving queue; and
   send a notification message to the virtual machine source address instructing the virtual machine source address to decrease rate of transmission of the data packets, wherein information about a congestion virtual machine source is encapsulated in a data packet payload readable by the intended congestion virtual machine source such that the intended congestion virtual machine source receives the notification message, and wherein the notification message is based on a mismatch between a data packet injection rate and a data packet consumption rate, of the receiving queue, over time.

9. The system of claim 8, wherein the data packets in the receiving queue are from a plurality of sources.

10. The system of claim 9, wherein the program code is further readable/executable by the processor to:
    attach a tag including the virtual machine source address to the data packets; and
    determine the virtual machine source address by the tag of the data packets.

11. The system of claim 10, wherein the program code is further readable/executable by the processor to:
    identify one of the plurality of sources by the determined virtual machine source address; and
    send the notification message to the identified one of the plurality of sources.

12. The system of claim 11, wherein the identified one of the plurality of sources is a virtual machine.

13. The system of claim 12, wherein the program code is further readable/executable by the processor to send the notification message from the virtual switching device through a physical switch to the virtual machine.

14. The system of claim 10, wherein the data packets of the determined virtual machine source address are data packets in the receiving queue exceeding a threshold rate of receipt.

15. The system of claim 14, wherein the program code is further readable/executable by the processor to:
sample respective rates of data packets entering the receiving queue from each of the plurality of sources;
identify a sampling rate exceeding the threshold rate of receipt;
identify one of the plurality of sources associated with the identified sampling rate; and
send the notification message to the identified one of the plurality of sources.

16. The system of claim 8, wherein the virtual machine source address corresponds to a local source in the virtual switching device and the notification message is sent to the local source using an explicit message.

17. A network switch, comprising:
a physical network interface card (NIC);
a virtual switching device interfaced with the physical NIC and connected to a source of data traffic; and
a buffer module connected to the virtual switching device including a receiving queue for data packets received by the virtual switching device from the source of data traffic, wherein the virtual switching device is configured to forward a notification message to the source of data traffic indicating congestion in the receiving queue, and wherein the notification message is based on a mismatch between a data packet injection rate and a data packet consumption rate, of the receiving queue, over time.

18. The network switch of claim 17, wherein the notification message is generated by a local vNIC or a remote network entity connected to the network switch.

19. The network switch of claim 18, wherein a destination of the notification message is a virtual machine MAC address.

20. The network switch of claim 17, wherein the virtual switching device is configured to add a congestion notification tag to a data packet corresponding to the notification message, wherein the congestion notification tag is configured to identify the source of data traffic.

* * * * *